July 8, 1969 D. C. GIBBS 3,454,775
INFORMATION DECODING APPARATUS EMPLOYING A FREQUENCY
SENSITIVE LIGHT RESPONSIVE RECEIVER
Filed Dec. 30, 1964
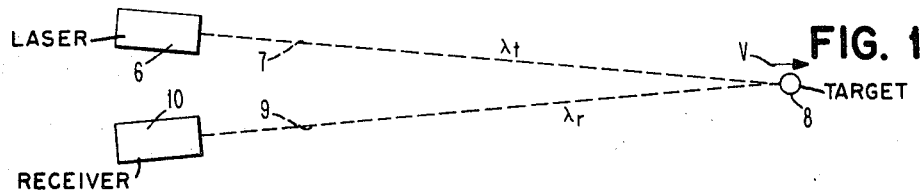
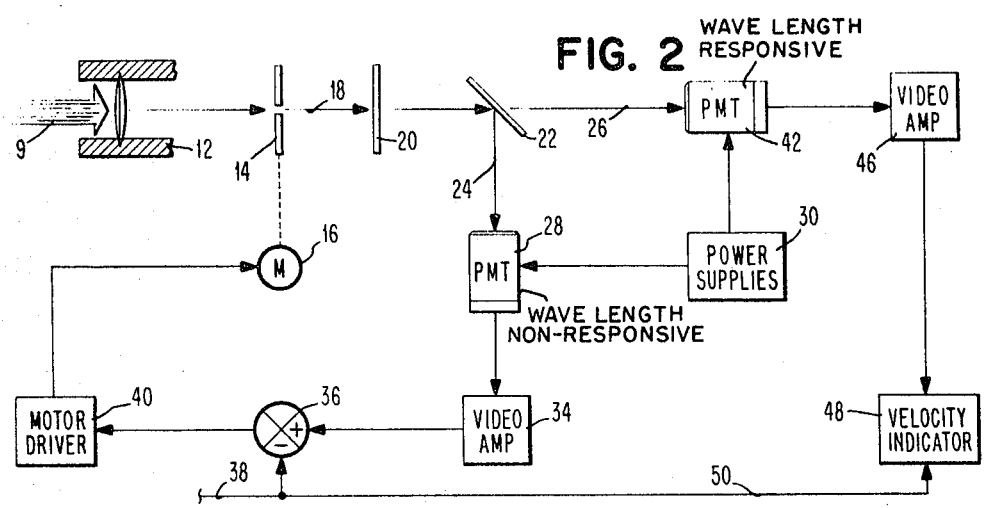
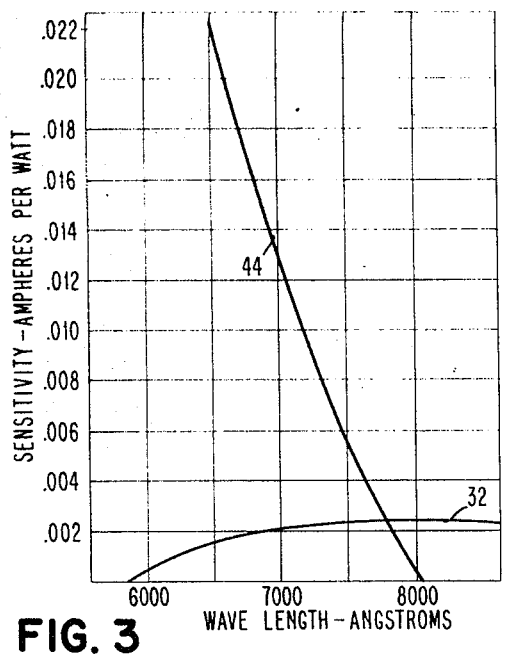
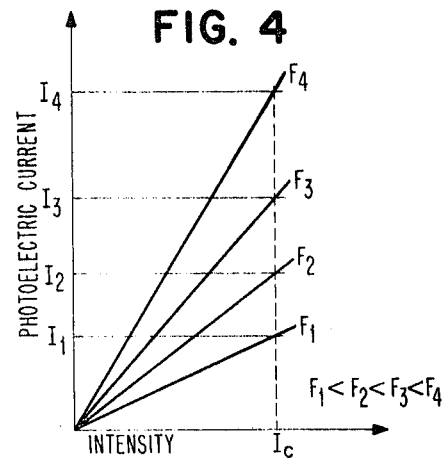
INVENTOR
DOYLE C. GIBBS
BY Edgar H. Kent
ATTORNEY United States Patent Office 3,454,775
Patented July 8, 1969

3,454,775
**INFORMATION DECODING APPARATUS EMPLOY-
ING A FREQUENCY SENSITIVE LIGHT RESPON-
SIVE RECEIVER**
Doyle C. Gibbs, Owego, N.Y., assignor to International
Business Machines Corporation, New York, N.Y., a
corporation of New York
Filed Dec. 30, 1964, Ser. No. 422,365
Int. Cl. H01j 39/00
U.S. Cl. 250—226                                14 Claims

ABSTRACT OF THE DISCLOSURE

Apparatus for translating information encoded in a light beam of variable frequency (for example, Doppler radar using a laser transmitter) includes a beam path defining structure for receiving an input beam of light. This input beam is passed through a variable attenuator and divided into two portions by beam splitter. A first portion impinges or a frequency independent photoelectric sensor having a Type $S_1$ photo surface which actuates a servo loop to control a variable attenuator so that the intensity of the light beam passed by that attenuator is maintained substantially uniform. A second portion of the attenuated input beam is sensed by a frequency dependent photoelectric sensor having a Type $S_{20}$ photocathode. As the input signal of this sensor varies essentially only as a function of frequency (due to the uniform intensity of the light beam impinging on it), that variation in output provides an indication of frequency information encoded in the light beam.

---

This invention relates to information decoding apparatus and more particularly to apparatus for sensing information encoded as a function of frequency on a carrier beam of light.

The development of apparatus capable of generating a coherent beam of light has made the transmission of information encoded in light beams theoretically feasible. Such a light beam may be useful for detecting remote objects, for example, after the fashion of radar, and information on the nature of velocity characteristics of the detected target can be obtained in terms of frequency by virtue of the Doppler effect. Significant velocity information would be encoded in such light beam systems in terms of a minor fraction of an angstrom unit but, so far as applicant is aware, the only techniques that have been proposed to employ such systems for velocity determinations require exteremely complex equipment and/or sophisticated components that are, at best, only in the early stages of development. For example, endeavors have been made to sense target velocity by determining frequency shifts in the a coherent light beam by classical radar techniques which involve the heterodyning of the signal reflected by the target with a continuously variable local oscillator signal. While continuously variable local oscillator devices are relatively easily realizable at microwave frequencies, no such devices operating at light frequencies are known to exist. Other attempts to utilize such light beam systems include attempts to modulate a light beam with a microwave signal and then sense the frequency shift in the microwave signal. Such a system merely utilizes the light beam as a carrier only, but nonetheless requires complex equipment.

It is an object of this invention to provide novel and improved information transmission apparatus.

Another object of this invention is to provide novel and improved apparatus for translating information encoded in terms of variable frequency in a light beam.

Another object of the invention is to provide novel and improved information translating apparatus that utilizes currently available components for decoding information encoded in terms of variable frequency in a light beam.

Still another object of this invention is to provide novel and improved information translation apparatus utilizing currently developed components for obtaining velocity information on the characteristics of moving targets from relatively small frequency shifts in a light beam.

In accordance with the invention there is provided a light beam receiving system in which, in response to an input beam of light, a beam portion of uniform intensity is produced that has the same frequency characteristics as the input beam applied to the receiver. A photoelectric sensor is disposed to sense this beam portion of uniform intensity. This photoelectric sensor produces an electric current output signal that varies as a direct function of the frequency information encoded in the beam portion producing apparatus and the photoelectric output signal generating apparatus may utilize components which are commercially available. The particular embodiment described hereinafter in detail employs as the beam portion producing apparatus a second photoelectric sensor which controls, through a servo link in a feedback loop, a variable attenuator disposed in the path of the input beam. A control input to this feedback loop is a reference signal which determines the magnitude of the beam portion of uniform intensity produced by the variable attenuator and which reference signal is also applied to the output signal sensor. This simple apparatus utilizing conventional components is capable of resolving velocity information encoded in a light beam within a few feet per second over a range of velocities in excess of several hundred thousand feet per second and functions to produce the same results that highly complex systems utilizing sophisticated components still in the developmental stage seek to produce.

Other objects, features and advantages of the invention will be seen as the following description of a particular embodiment of the invention progresses, in conjunction with the drawing, in which:

FIG. 1 is a diagrammatic view of a velocity determining system utilizing principles of the invention;

FIG. 2 is a block diagram of velocity data receiver apparatus constructed in accordance with the invention;

FIG. 3 is a graph indicating the response characteristics of the two photosurfaces utilized in the apparatus shown in FIG. 2; and FIG. 4 is a graph indicating the response of a typical photosensor in terms of photoelectric current as a function of light intensity and frequency.

The velocity determining system shown in FIG. 1 includes an energy source 6, such as a ruby laser operating in a continuous wave mode, which generates a coherent beam of light 7 of wavelength $\lambda_t$ for impingement on and reflection by target 8. The reflected beam 9, due to Doppler effect, has a wavelength characteristic $\lambda_r$ as a function of the velocity V of the target 8. Receiver apparatus 10 receives the reflected beam 9 and operates on it to provide velocity information with respect to target 8.

With reference to FIG. 2 the velocity receiver apparatus includes entrance optics generally indicated by the reference numeral 12 through which the beam of light 9, for example, as reflected from the remote target 8, passes for impingement on variable attenuator structure 14. In this particular embodiment this variable attenuator structure has a light transmitting portion with an area which may be varied by motor 16. Other variable light attenuator structures, such as Kerr cells, are also suitable for use in this system. The light beam portion 18 from the variable attenuator 14 is then passed by a band pass filter 20, the characteristics of which are sufficient to pass the frequency information of interest but which limit extraneous frequencies and thus reduce the "noise" in the system. This filtered light beam then is directed onto beam splitter 22 which divides that beam into two beam portions 24, 26.

Beam portion 24 is directed for impingement on a photomultiplier tube 28 which is energized by power supply 30. This photomultiplier tube 28 has an S1 photosurface (e.g. RCA Type 7102 photomultiplier tube), and its output characteristic is as indicated on curve 32 in FIG. 3. That characteristic, it will be noted, is substantially flat in that the change in output current due to frequency variation over a significant range is negligible compared to the change in output current due to changes in intensity over that same range.

As is well known, photoelectric current varies directly as a function of intensity in that absence of saturated operation of the photoelectric device. This characteristic of typical photomultiplier tubes is indicated in FIG. 4. As there seen, the photoelectric output current varies substantially linearly as the intensity of the impinging light beam varies for any given frequency, but the slope of this linearity characteristic normally varies as a function of frequency. This frequency dependence of an S1 type photosurface is substantially negligible over range of 6500 to 9500 angstroms, however. Thus, the variation in the output of photomultiplier tube 28 effectively is solely a function of the intensity of the impinging light beam 24.

This output signal in the form of an electric current is amplifide by video amplifier 34 and applied to servo unit 36 to which a reference signal is applied over line 38. The servo unit 36 compares the output of the video amplifier 34 and the reference signal applied on line 38 and, in response to a sensed difference, produces an output to operate motor control 40 to rotate motor 16 and adjust the characteristics of variable attenuator 14. This feedback loop thus adjusts the variable attenuator 14 to maintain the intensity of the light beam 18 passed by the variable attenuator directly related to the reference signal applied on line 38, which conventionally is held constant. The reference signal may, of course, be varied as desired, for example, to compensate for different types of input conditions.

Thus, the feedback loop maintains the output beam 18 at substantially uniform intensity. The portion 26 of this beam as produced by beam splitter has the uniform intensity characteristics and retains the undistorted frequency characteristics of the input beam 12. Beam portion 26 is applied to a second photomultiplier tube 42 which has an S20 photosurface of characteristics indicated by curve 44 in graph of FIG. 2. This photomultiplier tube is also energized by an appropriate power supply indicated in FIG. 2 as power supply 30. The output current from photomultiplier 42 is now only frequency dependent since intensity variation has been normalized and is applied to a video amplifier 46, and the output signal from amplifier 46 is applied to an indicator 48, which responds to an electric signal and is calibrated in terms of velocity as a function of the frequency response characteristics of the photosurface, as indicated by curve 44 of FIG. 3. The reference signal applied on line 38 may also be applied to the velocity indicator 48 over line 50 to provide coordinated compensation for changes in the reference signal.

It should be noted that should the response of photomultiplier tube 28 not be flat so that its output is sensitive to changes in frequency, a significant factor is the relative frequency sensitivity of the photosurfaces of photomultiplier tubes 28 and 42. The slope of the frequency response characteristic of photomultiplier tube 28 should be negligible when compared to the slope of the frequency response characteristic of photomultiplier tube 42, and the higher the ratio of the response characteristics of the two photomultiplier tubes in the frequency range of interest, the greater the accuracy of the system. Thus, it will be obvious that the inventive concept is not limited to the S1 and S20 photosurface combination, although that combination is particularly useful at wavelength ranges in the vicinity of 7000 angstroms.

As an example of the operation of this apparatus, assume, for convenience of analysis, that the wavelength of the energy source 6 is 6943 angstroms; that the power of the filtered, attenuated input beam 18 as applied to the beam splitter 22 is 0.2 microwatt; and that the beam splitter divides the impinging beam into two equal portions so that the power applied to photomultiplier tube 42 is 0.1 microwatt. The response of an RCA 7265 photomultiplier tube with an S20 cathode (photomultiplier tube 42) at this frequency produces an output current $$I_0 \cong -16\mu a./A.(\lambda_r) + 125.2 \text{ milliamperes} \quad (1)$$
$$\lambda_r = C - V/C + V(\lambda_t) \text{ (Doppler effect)} \quad (2)$$

Combining these equations:

$$I_0 \cong -16\mu a./A.(C-V/C+V)(\lambda_t) -125.2 \text{ milliamperes} \quad (3)$$

As $\lambda_t$ is 6943 angstroms $$I_0 \cong -111.0 \ (C-V/C+V) + 125.2 \text{ milliamperes} \quad (4)$$

The first derivitive $$\Delta I_0/\Delta V \cong +222.0 \ C/(C+V)^2 \quad (5)$$

and where C is much larger than V $$\Delta V/\Delta I_0 \cong 4.43 \times 10^3 \text{ f.p.s./microampere} \quad (6)$$

Where the photomultiplier noise is in the order of 0.01 microampere and the feedback loop is capable of maintaining the intensity of output beam 18 within 0.5 microwatt, it can readily be calculated that the velocity resolution of this apparatus is in the order of 315 feet per second. With a filter having a twenty angstrom bandwidth ($\pm$ ten angstroms), the velocity range capabilities of the apparatus is in the order of 700,000 feet per second. Through improved feedback loop design and component selection, the system resolution may be improved by a factor of ten or more. It will be noted also that the range of velocities which the system will handle may also be increased substantially with the use of a filter of greater bandwidth.

While a particular embodiment of the invention has been shown and described, a variety of modifications thereof will be obvious to those skilled in the art. As indicated above, the utility of the invention is not limited to the velocity determinations, and it also may be of use in communication systems for translating information encoded in terms of the variable frequency in a light beam. Therefore, it will be understood that the invention is not intended to be limited to the disclosed embodiment or to details thereof, and various changes may be made therein without departing from the spirit and scope of the invention.

What is claimed is:

1. Information receiver apparatus for receiving and decoding information carried in a beam of coherent light in terms of frequency, comprising means responsive to an input beam of coherent light for producing an output beam of coherent light having a uniform light intensity characteristic and the same frequency characteristics as the input beam of light, and light sensitive means responsive to said output beam of light for decoding information encoded in terms of frequency in said input beam of light.

2. The combination as claimed in claim 1 wherein said output beam producing means includes means to control the light transmission characteristics of a light path as a function of the intensity of said input beam to maintain a consistent intensity light output from said path.

3. The combination as claimed in claim 1 wherein said light sensitive means includes a photoelectric sensor.

4. Information receiver apparatus for receiving and decoding information carried in a beam of coherent light in terms of frequency, comprising means defining a beam path for receiving an input beam,
   means disposed in said beam path responsive to said input beam for producing a beam portion of uniform intensity that has the same frequency characteristics as the input beam applied to the receiver,
   and a photoelectric sensor disposed to sense said uniform intensity beam portion and produce an electric current output signal that varies as a direct function of the frequency information encoded in said input beam of light.

5. The apparatus as claimed in claim 4 wherein said beam portion producing means includes a photoelectric sensor that has a response characteristic that varies as a function of light intensity and that is substantially independent of frequency over the frequency range of interest.

6. Information receiver apparatus for receiving and decoding information carried in a beam of coherent light in terms of frequency, comprising means defining a beam path,
   a variable attenuator disposed in said beam path,
   a servo system for controlling said variable attenuator as a function of an input reference signal including a light sensor responsive to the light beam passed by said variable attenuator for producing an output, and means for producing an output signal as a function of the difference between said input reference signal and the output of said light sensor to control said variable attenuator to maintain the intensity of the light beam passed by said variable attenuator at a uniform value,
   and a photoelectric sensor disposed to sense the light beam passed by said variable attenuator and produce an electric current that varies as a direct function of the frequency characteristics of said light beam applied to said receiver apparatus.

7. The apparatus as claimed in claim 6 wherein said light sensor is of the photoelectric type and the slope of the frequency response characteristic of said light sensor is negligible as compared with the slope of the frequency response characteristic of said photoelectric sensor.

8. The apparatus as claimed in claim 6 wherein said variable attenuator has a transparent aperture of variable diameter.

9. Information receiver apparatus for receiving and decoding information carried in a beam of coherent light in terms of frequency, comprising means defining a beam path,
   a variable attenuator and beam splitting means serially disposed in said beam path, said beam splitting means dividing the light beam passed by said variable attenuator into two portions,
   a servo system for controlling said variable attenuator as a function of an input reference signal including a light sensor responsive to a first beam portion produced by said beam splitting means for producing an output, and means for producing an output signal as a function of the difference between said input reference signal and the output of said light sensor to control said variable attenuator to maintain the intensity of the light beam passed by said variable attenuator at a uniform value,
   and a photoelectric sensor disposed to sense the second beam portion produced by said beam splitting means and produce an electric current that varies as a direct function of the frequency characteristics of said light beam applied to said receiver apparatus.

10. Target velocity determination apparatus comprising a laser transmitter operating in a continuous wave mode for generating a coherent beam of light of known frequency,
    and receiver means for receiving a portion of said beam of light reflected from a remote target,
    said receiver means including means defining a beam path for said reflected light beam,
    means disposed in the path of said reflected light beam including a photoelectric sensor having a response characteristic that is substantially independent of frequency over the frequency range of interest, and
    means responsive to said first photoelectric sensor for modifying said beam path to produce a beam portion of uniform intensity,
    and a second photoelectric sensor having a response characteristic that varies substantially directly as a function of frequency over the frequency range of interest for producing an output signal indicative of the difference between said known frequency and the frequency of said reflected light beam,
    and means responsive to the output signal from said second photoelectric sensor for producing an indication of the velocity of said target.

11. Target velocity determination apparatus comprising a laser transmitter operating in a continuous wave mode for generating a coherent beam of light of known frequency,
    and receiver means for receiving a portion of said beam of light reflected from a remote target,
    said receiver means including means defining a beam path for said reflected light beam,
    a variable attenuator disposed in said beam path,
    a servo system for controlling said variable attenuator as a function of an input reference signal including a light sensor responsive to the light beam passed by said variable attenuator for producing an output, and means for producing an output signal as a function of the difference between said input reference signal and the output of said light sensor to control said variable attenuator to maintain the intensity of the light beam passed by said variable attenuator at a uniform value,
    and a photoelectric sensor having a response characteristic that varies substantially directly as a function of frequency over the frequency range of interest for producing an output signal indicative of the difference between said known frequency and the frequency of said reflected light beam,
    and means responsive to the output signal from said photoelectric sensor for producing an indication of the velocity of said target.

12. The apparatus as claimed in claim 11 wherein said light sensor is of the photoelectric type and the slope of the frequency response characteristic of said light sensor is negligible as compared with the slope of the frequency response characteristic of said photoelectric sensor.

13. The apparatus as claimed in claim 12 wherein said variable attenuator has a transparent aperture of variable diameter.

14. Target velocity determination apparatus comprising a laser transmitter for generating a coherent beam of light of known frequency,
    and receiver means for receiving a portion of said light beam reflected from a remote target, said receiver means including means defining a beam path for said reflected light beam,
    a variable attenuator and beam splitting means serially disposed in said beam path, said beam splitting means dividing the light beam passed by said variable attenuator into two portions,
    a servo system for controlling said variable attenuator as a function of an input reference signal including
    a light sensor responsive to a first beam portion produced by said beam splitting means for producing an output, and means for producing an output signal as a function of the difference between said input reference signal and the output of said light sensor to control said variable attenuator to maintain the intensity of the light beam passed by said variable attenuator at a uniform value, a photoelectric sensor disposed to sense the second beam portion produced by said beam splitting means and produce an electric current that varies as a direct function of the frequency characteristics of said second beam portion, and indicator means responsive to the electric current from said photoelectric sensor for producing an indication of the velocity of said target.

References Cited

UNITED STATES PATENTS

| | | | |
|---|---|---|---|
| 2,517,330 | 8/1950 | Mareholtz | 250—208 X |
| 2,655,848 | 10/1953 | Gray | 250—201 X |
| 3,150,363 | 9/1964 | Finvold. | |

ARCHIE R. BORCHELT, *Primary Examiner.*

T. N. GRIGSBY, *Assistant Examiner.*

U.S. Cl. X.R.

250—201, 205, 217, 229; 329—131; 356—28